United States Patent
Biemelt et al.

(10) Patent No.: US 7,475,679 B2
(45) Date of Patent: Jan. 13, 2009

(54) FUEL SUPPLY SYSTEM FOR AN INTERNAL COMBUSTION ENGINE

(75) Inventors: Andreas Biemelt, Stuttgart (DE); Peter Dittrich, Brunnthal-Hofolding (DE); Gerd Huber, München (DE); Alexander Koren, Neufahm (DE); Stephan Krämer, Schwalkhelm (DE); Paul Neumeir, Neufahm (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 11/904,597

(22) Filed: Sep. 27, 2007

(65) Prior Publication Data

US 2008/0035110 A1 Feb. 14, 2008

Related U.S. Application Data

(63) Continuation-in-part of application No. PCT/EP2006/002749, filed on Mar. 25, 2006.

(30) Foreign Application Priority Data

Mar. 31, 2005 (DE) ........................ 10 2005 014 644

(51) Int. Cl.
*F02M 23/00* (2006.01)
*F02M 23/04* (2006.01)

(52) U.S. Cl. ........................ 123/531; 123/533

(58) Field of Classification Search ................. 123/531, 123/533, 527, 532, 534, 26; 239/88–91, 239/533.3–533.15, 537

See application file for complete search history.

(56) References Cited

U.S. PATENT DOCUMENTS

| | | | | |
|---|---|---|---|---|
| 4,846,114 A * | 7/1989 | List | ........................... | 123/26 |
| 5,046,472 A * | 9/1991 | Linder | ........................ | 123/533 |
| 5,894,991 A * | 4/1999 | Edwards et al. | ................ | 239/88 |
| 6,000,628 A * | 12/1999 | Lorraine | ...................... | 239/87 |
| 6,626,159 B1 * | 9/2003 | Hans et al. | ................... | 123/531 |
| 6,955,161 B2 * | 10/2005 | Suzuki et al. | ................ | 123/533 |
| 2005/0066939 A1 * | 3/2005 | Shimada et al. | ............. | 123/431 |

FOREIGN PATENT DOCUMENTS

| | | |
|---|---|---|
| DE | 199 45 544 | 10/2000 |
| EP | 0 395 876 | 11/1990 |
| EP | 1 491 742 | 12/2004 |
| EP | 1 491 753 | 12/2004 |

* cited by examiner

*Primary Examiner*—Mahmoud Gimie
(74) *Attorney, Agent, or Firm*—Klaus J. Bach

(57) ABSTRACT

In a fuel supply system for a spark-ignition internal combustion engine having a blow-in valve for each cylinder for blowing an easily ignitable mixture of a liquid fuel and a combustion gas via a blow-in nozzle into a combustion chamber of the internal combustion engine, the blow-in valve has a pressure connection for supplying pressurized combustion gas to a blown-in nozzle from an external pressure source, and the blow-in valve has a piston/cylinder unit for delivering the liquid fuel for injection into the cylinder together with the combustion gas, with a plunger being provided for an at least indirect actuation of a nozzle needle of the blow-in nozzle controlling the injection of a metered quantity of fuel and the combustion gas into the combustion chamber.

10 Claims, 4 Drawing Sheets

FUEL SUPPLY SYSTEM FOR AN INTERNAL COMBUSTION ENGINE

This is a Continuation-In-Part Application of pending International Patent Application PCT/EP2006/002749 filed Mar. 25, 2006 and claiming the priority of German Patent Application 10 2005 014 644.9 filed Mar. 31, 2005.

BACKGROUND OF THE INVENTION

The invention relates to a fuel supply system for a spark-ignition internal combustion engine having arranged on each cylinder a blow-in nozzle for the introduction of a mixture of fuel and a combustion gas into a combustion chamber.

Spark-ignition internal combustion engines have an unsatisfactory efficiency in particular in the part-load range as a result of high charge exchange losses. One possibility for reducing said charge exchange losses and thereby improving efficiency resides in exhaust gas recirculation. By means of exhaust gas recirculation, the engine can operate unthrottled during part-load operation, which reduces the required charge exchange work of the engine and increases the compression pressure.

An increase in the proportion of recirculated exhaust gas can however also bring about a degradation of the ignitability and combustion of the mixture of fuel, air and exhaust gas. Misfiring can even occur.

In order to utilize the advantages of a high exhaust gas recirculation rate and in order to obtain the ignitability required for this purpose, DE 199 45 544 A1 discloses a fuel supply system for a spark-ignition internal combustion engine in which a first fuel metering device comprises an intake pipe injector which is arranged in an intake duct which opens out into the combustion chamber. By means of the intake pipe injector, a fuel quantity is injected in order to form a lean mixture with a predefined exhaust gas proportion. For reliable ignition, one blow-in valve is provided per cylinder, which blow-in valve, in order to ignite the lean mixture, blows a mixture of a small liquid fuel quantity and air as a combustion gas into the combustion chamber. The quantity which is blown in can be easily and reliably ignited. After ignition, the mixture quantity ignites the remaining mixture.

It is the principal object of the present invention to provide an internal combustion engine with a fuel supply system which is small and effectively supplies a mixture of fuel and combustion air into the cylinders of the engine.

SUMMARY OF THE INVENTION

In a fuel supply system for a spark-ignition internal combustion engine having a blow-in valve for each cylinder for blowing an easily ignitable mixture of a liquid fuel and a combustion gas via a blow-in nozzle into a combustion chamber of the internal combustion engine, the blow-in valve has a pressure connection for supplying pressurized combustion gas to a blow-in nozzle from an external pressure source and the blow-in valve has a piston/cylinder unit for delivering the liquid fuel for injection into the cylinder together with the combustion gas, with a plunger being provided for an at least indirect actuation of a nozzle needle of the blow-in nozzle controlling the injection of a metered quantity of fuel and the combustion gas into the combustion chamber.

In the proposed arrangement, the piston/cylinder unit has a dual function. On the one hand, the piston/cylinder unit serves to meter a certain fuel quantity and to deliver the fuel quantity which is to be blown in. At the same time, the piston of the piston/cylinder unit additionally, actuates the nozzle needle of the blow-in nozzle.

Compression and delivery of the combustion gas in particular in the form of air is not provided by the piston/cylinder unit. An external pressure source in the form of a compressor, if appropriate with an interposed pressure accumulator, is actually provided for this purpose. The dual function of the piston/cylinder unit results in a very compact design of the blow-in valve and to its precise operation.

In an advantageous refinement of the invention the piston/cylinder unit forms a slot control arrangement for controlling the fuel delivery. For this purpose, a valve piston is expediently arranged coaxially between a plunger and a nozzle needle, defining therebetween a fuel chamber for providing and delivering a certain fuel quantity between the plunger and the valve piston which is to be blown into a cylinder. In particular, the plunger forms the slot controller for a fuel supply into the fuel chamber, while the valve piston forms a slot controller for a fuel line from the fuel chamber to the blow-in nozzle. The two slot controllers are advantageously coordinated with one another in such a way that, at the end of the delivery of the fuel quantity, the plunger abuts against the valve piston. A non-return valve is expediently arranged in the fuel line to the blow-in nozzle.

The slot control arrangement brings about a defined shut-off or opening of the fuel path at precise times with low installation volume space requirements. The abutment of the plunger against the valve piston at the end of the delivery of the fuel quantity which is to be blown in establishes a structurally precisely predefined volume of the fuel chamber between the plunger and the valve piston, which volume, in particular in connection with the slot controller, likewise precisely measures the fuel and controls its flow. At the same time, the abutment of the plunger against the valve piston leads to an effective force transmission in the direction of the nozzle needle. The non-return valve in the fuel line permits an unrestricted fuel supply flow in the direction of the blow-in nozzle, while an undesired fuel return flow is prevented in the event of a counterpressure building up in the region of the blow-in nozzle.

The two slot controllers advantageously have a spacing from one another exceeding that of two piston sections of the plunger and of the valve piston during a pilot stroke. It is ensured that, in the time sequence, initially the plunger closes the assigned slot controller for the fuel supply, before the second slot controller which is assigned to the valve piston is subsequently opened after a common axial movement of the plunger and valve piston. Leakages and inaccuracies in the fuel measurement resulting therefrom are avoided.

In an advantageous refinement, an actuation of the nozzle needle is provided by means of the valve piston which is actuated by the plunger. With a coaxial design, the plunger initially abuts the valve piston in the above-described way. The unit composed of the plunger and valve piston which bears in a form-fitting manner against one another is subsequently moved in the direction of the nozzle needle until the latter is opened. With a simple and space-saving design, a sequential progression of fuel metering and subsequent blow-in as a result of the opening of the nozzle needle is ensured in a desirable manner.

In its resting state the valve piston advantageously is axially spaced from the nozzle needle. After the delivery of the fuel quantity, the unit composed of the plunger and valve piston must initially overcome the spacing as a dead travel distance. The dead travel distance ensures that the valve opens only after the complete conclusion of the fuel metering and delivery.

In one preferred embodiment, an actuation of the valve piston and of the nozzle needle is provided in each case counter to the preload force of a compression spring. In particular, two compression springs are supported against a common pressure plate which is fastened to the nozzle needle, with the preload force of the valve-piston-side pressure spring in the compressed state being lower than a basic preload force of the nozzle-needle-side pressure spring. With suitable dimensioning, the pressure springs hold the valve piston and the nozzle needle reliably closed even when external hydraulic or pneumatic pressure forces are applied. After the opening for example under the action of a camshaft, a fast closure is brought about. Said coordination of the preload forces brings about a sequential actuation of the valve piston and subsequently of the nozzle needle. Initially, the valve piston is moved counter to the preload force of the pressure spring which is assigned to it. The preload force which is generated in the compressed state is however not sufficient to overcome the higher basic preload of the nozzle-needle-side pressure spring. An opening of the nozzle needle takes place only by means of an abutment of the valve piston against the nozzle needle, which in geometrically precisely defined sequence, brings about a lift of the nozzle needle and therefore an opening of the blow-in nozzle.

In an advantageous refinement, a tappet is provided for actuating the plunger. An actuation of the tappet and/or of the plunger counter to the preload force of in each case one pressure spring is expediently provided. The arrangement permits a design with low individual masses and fast spring-load-induced restoring times. The blow-in valve can be operated with short reaction times even at high speeds of the internal combustion engine.

An exemplary embodiment of the invention will be described below in more detail on the basis of the accompanying drawings:

DESCRIPTION OF EXEMPLARY EMBODIMENTS

Figure 1:
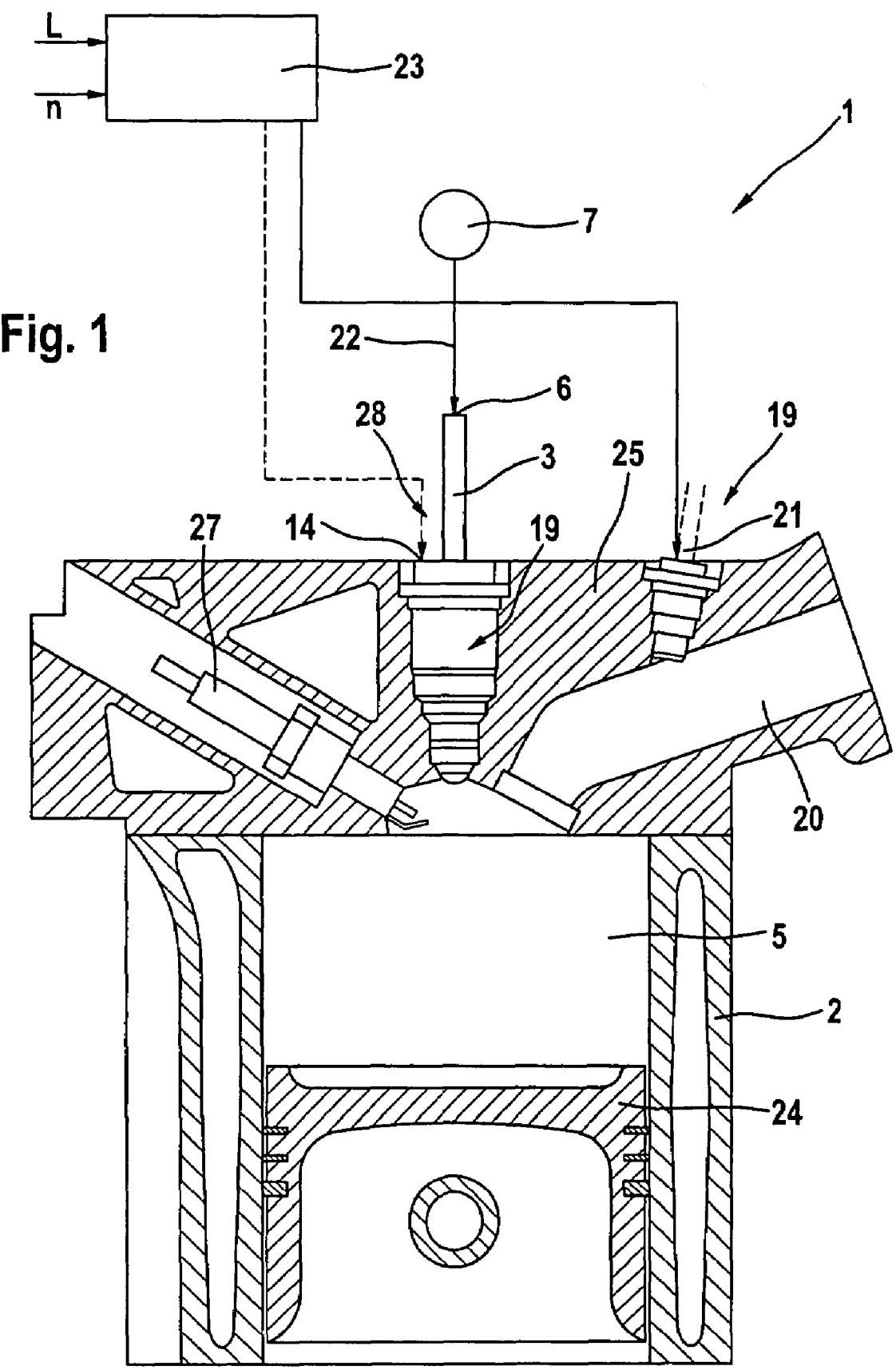
FIG. 1 shows schematically a longitudinal cross-section of an internal combustion engine with a blow-in valve.

In the internal combustion engine 1 illustrated in FIG. 1, a reciprocating piston 24 is arranged in a known way in each cylinder 2, which reciprocating piston 24 delimits a combustion chamber 5 and is closed off by a cylinder head 25. In the combustion chamber 5, a mixture of fuel and combustion gas is ignited and burned by the ignition spark of a spark plug, which is arranged on the cylinder head 25, in order to drive the piston 24. The combustion gas is supplied to the combustion chamber through at least one inlet or intake duct 20. For the discharge of exhaust gas, the cylinders 2 are equipped with corresponding outlet ducts. The charge exchange of the cylinders is controlled by gas exchange valves (not illustrated here) which are arranged in the inlet ducts and outlet ducts.

The fuel supply system of the internal combustion engine 1 comprises a fuel metering device 19 with at least one intake duct injector 21 which dispenses fuel into the intake duct 20 with an external mixture formation. Here, all the cylinders 2 of the internal combustion engine 1 can be assigned a common intake pipe injector 21 and can be arranged in a common intake line (single-point injection), or each cylinder 2 can be assigned a respective intake pipe injector 21 (multi-point injection). The intake pipe injector 21 is part of a fuel supply system which additionally comprises, per cylinder 2, at least one further blow-in valve 3 which is installed in a central position in the cylinder 2 and which, as a further fuel metering device 19, dispenses fuel together with oxygen-rich combustion gas directly into the combustion chamber 5.

For this purpose, a fuel supply 28 and a fresh air supply 22 are connected to the blow-in valve 3. The fuel supply conducts a liquid fuel such as gasoline into the blow-in valve 3 via a fuel inflow 14. The fresh air supply 22 comprises a schematically illustrated external pressure source 7 which is connected to the blow-in valve 3 by means of a pressure connection 6. The external pressure source is for example a separate compressor or the like which commonly supplies all the blow-in valves 3 of all the cylinders 2 with compressed air or some other oxygen-rich combustion gas. Part of the pressure source 7 can also be a compensating or storage tank which is arranged between the compressor and the pressure connection 6 and which serves to even out the pressure level.

The fuel quantity which is to be metered at the respective operating point of the internal combustion engine 1 is determined by a control unit 23 to which input operating parameters are supplied, for example the operating load L and/or the speed n of the internal combustion engine 1, which are suitable for determining the operating point of the internal combustion engine 1 and the corresponding required fuel quantity.

The blow-in valve 3 is used at least in certain operating ranges of the internal combustion engine 1 to carry out an ignition injection, which takes place during the compression stroke of the respective cylinder 2 and enriches an otherwise lean basic mixture in the combustion chamber 5 to an ignitable degree. Here, the control unit 23 initiates the preparation of a lean basic mixture by means of corresponding actuation of the metering devices which can be controlled by it, that is to say at least the intake duct injector 21. It is however also possible, in order to introduce the fuel quantity, for example when said fuel quantity can be adjusted as a function of the engine operating point, to also assign direct injection valves to the control unit 23. Here, the blow-in valve 3 and also the intake pipe injector 21 could be connected by means of a control line (illustrated by dashed lines), with the control unit 23 coordinating the opening of the injectors 21, 3 with one another and configuring the fuel/air mixture by combining the internal mixture formation with the external mixture formation.

The actuation of the blow-in valve 3 in the context of the ignition injection for enriching the basic mixture in the combustion chamber can, according to the present invention, take place independently of the operating-point-dependent fuel metering. A fuel supply system can therefore also be advantageous in which an independently-actuated blow-in valve 3, which is actuated for example by a camshaft, is provided in addition to the devices which can be actuated by the control unit 23 for operating-point dependent fuel metering.

During the mixture formation, a lean basic mixture with a high exhaust gas content is formed in the combustion chamber 5 with the fuel which is metered by the control unit 23. Herein, the exhaust gas can be provided by exhaust gas recirculation from the exhaust line of the internal combustion engine 1. The exhaust gas is particularly advantageously retained in the combustion chamber 5 after the combustion, as it is possible in a simple way by means of suitable setting of the control times of the gas exchange valves to generate an underpressure in the combustion chamber 5 which prevents the exhaust gas from leaving the combustion chamber 5 when the outlet valve is open, or which sucks the exhaust gas from the exhaust duct back into the combustion chamber 5. During the blow-in of liquid fuel within the context of the ignition injection, the combustion gas, which is blown the combustion chamber, displaces the basic mixture with a high exhaust gas content. The blow-in valve 3 is arranged in the vicinity of the spark plug 27 and, during ignition injection, blows oxygen-rich combustion gas, in particular air, into the region of the electrodes of the spark plugs 27, as a result of which an ignitable mixture is present at the spark plug at ignition time. After the ignition of the fuel injected with the oxygen-rich combustion gas, the exhaust-gas-rich mixture in the combustion chamber 5 is ignited, with the ignition injection creating the possibility of forming and burning in the combustion chamber 5 a basic mixture which is difficult to self-ignite or does not self-ignite. As a result of the blow-in of the fuel for the ignition injection together with oxygen-rich combustion air, the basic mixture is displaced from the region of the spark plug 27. Carrying out the ignition injection with an air-assisted method permits an enormous increase in the possible exhaust gas content in the basic mixture in relation to previously conceivable exhaust gas recirculation rates, and thus contributes significantly to a reduction in the exhaust gas emissions of the internal combustion engine 1.

FIGS. 2 to 6 show, in a longitudinally-sectioned illustration, an exemplary embodiment of the blow-in valve 3 illustrated merely schematically in FIG. 1. In FIGS. 2 to 6, identical components or features have the same reference symbols.

Figure 2:
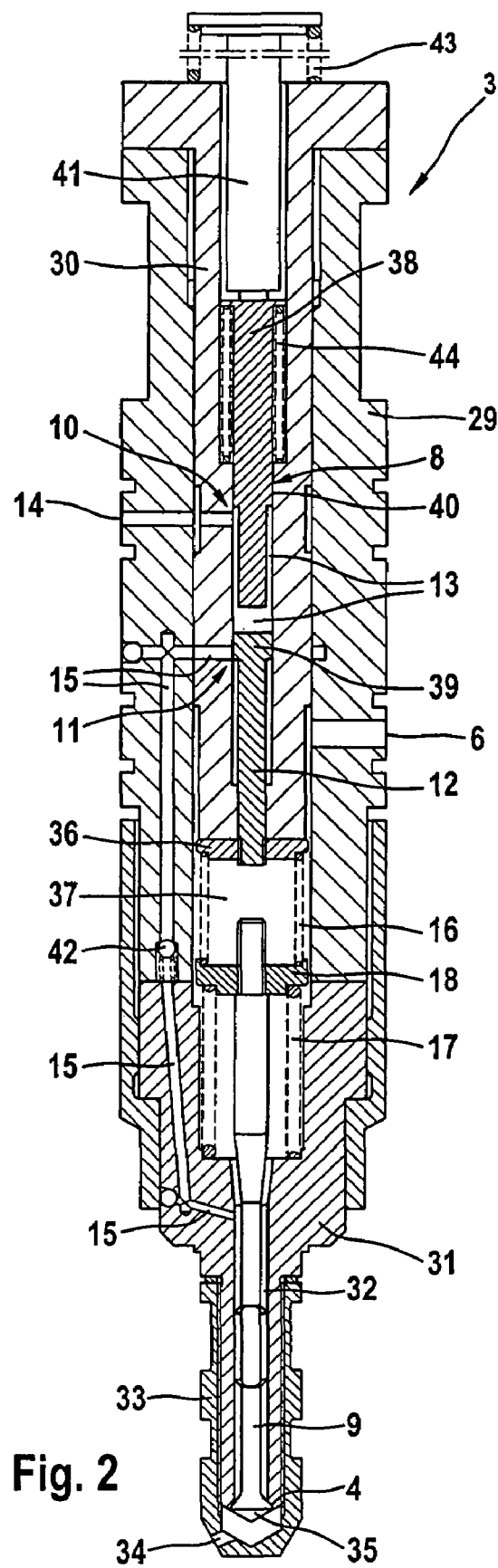
FIG. 2 is a longitudinal cross-sectional view of the blow-in valve as per FIG. 1 in the rest state.

In FIG. 2, the blow-in valve 3 has a housing which is composed substantially of an outer housing 29, an inner housing 30 and a head piece 31. Integrally formed along the longitudinal axis of the inner housing 30 is a narrow hollow cylindrical opening 40 in which a plunger 8 and a valve piston 12 are guided in a longitudinally moveable manner as separate components which are not connected to one another. The plunger 8 and the valve piston 12 have each a section with a diameter which is reduced in relation to the cylinder opening 40, which section is adjoined, upwardly with respect to the graphic illustration, by in each case a piston section 38, 39. The piston sections 38, 39 slide in a hydraulically sealed manner in the cylinder 40, thereby forming a piston/cylinder unit.

A fuel inflow 14 opens into a fuel chamber 13 which is delimited in the peripheral direction by the cylinder 40 and in the axial direction by the two piston sections 38, 39. In the region of the fuel chamber 13, a fuel line 15 branches off from the cylinder 40, which fuel line 15 contains a non-return valve 42 and which fuel line 15 opens out into an annular space 32 which extends around a nozzle needle 9. Provided separately from the above-described piston/cylinder unit, laterally in the outer housing 29, is a pressure connection 6 which communicates with an air chamber 37 which is situated below the inner housing 30 and is delimited radially by the outer housing 29. The air chamber 37, like the fuel line 15, is fluidically connected to the annular space 32 which is delimited in the axial direction downwardly by the blow-in nozzle 4 which is illustrated here in the closed state. Here, the blow-in nozzle 4 is closed off by means of a conical valve head 35 of the nozzle needle 9 bearing against a sealing seat. No valves, control means or the like are arranged between the pressure connection 6 and the blow-in nozzle 4, such that the air pressure or gas pressure of the pressure source 7 (FIG. 1) also prevails in the annular space 32 and at the blow-in nozzle 4 in the resting state.

Screwed to an upper end of the nozzle needle 9, which faces toward the air chamber 37, is a pressure plate 18, between which pressure plate 18 and a lower shoulder of the head piece 31 a pressure spring 17 is arranged under preload. The pressure spring is dimensioned such that it holds the nozzle needle 9 in the closed position counter to the applied gas pressure in the air chamber 37 and counter to the preload force of an upper pressure spring 16 which presses against the opposite side of the pressure plate 18. In this way, the downwardly or outwardly opening nozzle needle 9 bears sealingly with its conical valve head 35 against the sealing seat of the blow-in nozzle 4 as a result of the spring preload.

Screwed to the lower end of the valve piston 12, which projects into the air chamber 37, is a pressure plate 36 on which the upper end of the pressure spring 16 is supported. In the rest position shown, the preload force of the pressure spring 16 has the effect that the pressure plate 36 bears against the lower end of the inner housing 30 and thereby holds the valve piston 12 in an upper rest position. In the upper rest position of the valve piston 12, the piston section 39 closes off the fuel line 15 in the region of the fuel chamber 13. In the event of an axial movement, described further below, of the valve piston 12 counter to the preload force of the pressure spring 16, the piston section 39 opens the fuel line 15 to the fuel chamber 13, thereby forming a slot controller 11 for the fuel line 15. In the rest position shown, the valve piston 12 is situated at an axial spacing to the coaxially-arranged nozzle needle 9.

The plunger 8 which is arranged coaxially with respect to the valve piston 12 and with respect to the nozzle needle 9 and is arranged in a sliding fashion above these components in the cylinder 40, is axially spaced from the valve piston 12 in the rest position shown, wherein the piston section 38 of the plunger 8 is situated above the fuel in-flow 14 which opens out into the fuel chamber 13. The fuel inflow 14 is opened in the direction of the fuel chamber 13 and is fluidically connected thereto. In the rest position shown, the volume of the fuel chamber 13 is filled with liquid fuel, in particular in the form of gasoline, as a result of the fuel pressure prevailing at the fuel inflow 14.

Arranged coaxially with respect to the plunger 8, above the latter on its side which faces toward the piston section 38, is a tappet 41 which bears against the face side of the piston section 38. The contact is brought about by a pressure spring 44 which acts on the plunger 8 and presses the latter upward against the tappet 41. The axial mobility of the plunger 8 is delimited in the direction of the tappet 41 by the latter. The fuel pressure prevailing in the fuel chamber 13 and the preload force of the pressure spring 44 cannot move the plunger 8 upward as a result of the supporting action of the tappet 41. The geometry and preload force of the pressure spring 16 are dimensioned such that, in the rest position shown, they hold the valve piston 12 in its upper position shown, counter to the fuel pressure prevailing in the fuel chamber 13. The volume of the fuel chamber 13 is accordingly structurally defined.

The tappet 41 which is axially moveable counter to a pressure spring 43 is provided for actuation for example by means of a camshaft (not illustrated). It is also possible that an electromagnetic or other similar actuation is provided. In the case of an actuation of the tappet 41, or axial movement in the direction of the blow-in nozzle 4, as described in more detail further below, said tappet 41 presses the plunger 8 axially downward, with fuel being pressed out of the fuel chamber 13 back into the fuel inflow 14 as a result of its substantially incompressible properties. The axial movement of the tappet 41 together with the plunger 8 initially takes place until the plunger 8 assumes its axial position shown in FIG. 3, in which its piston section 38 closes off the fuel inflow 14. Here, the piston section 38 of the plunger 8 together with the fuel inflow 14 forms a slot controller 10.

Figure 3:
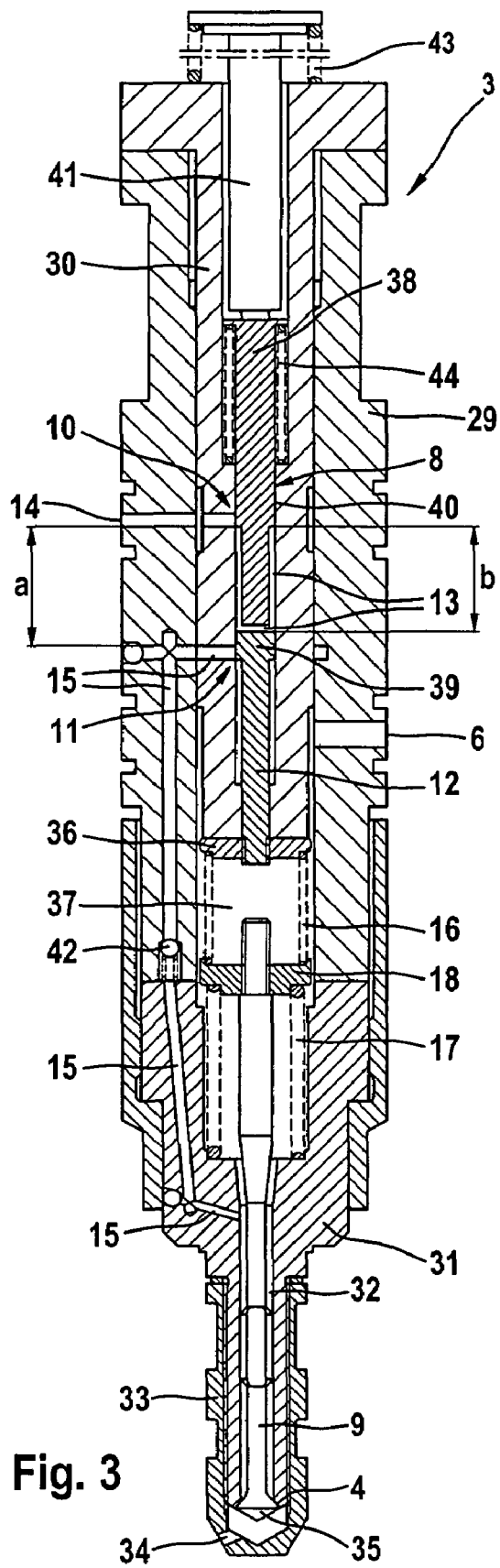
FIG. 3 shows the blow-in valve as per FIG. 1 in the pilot stroke.
Figure 4:
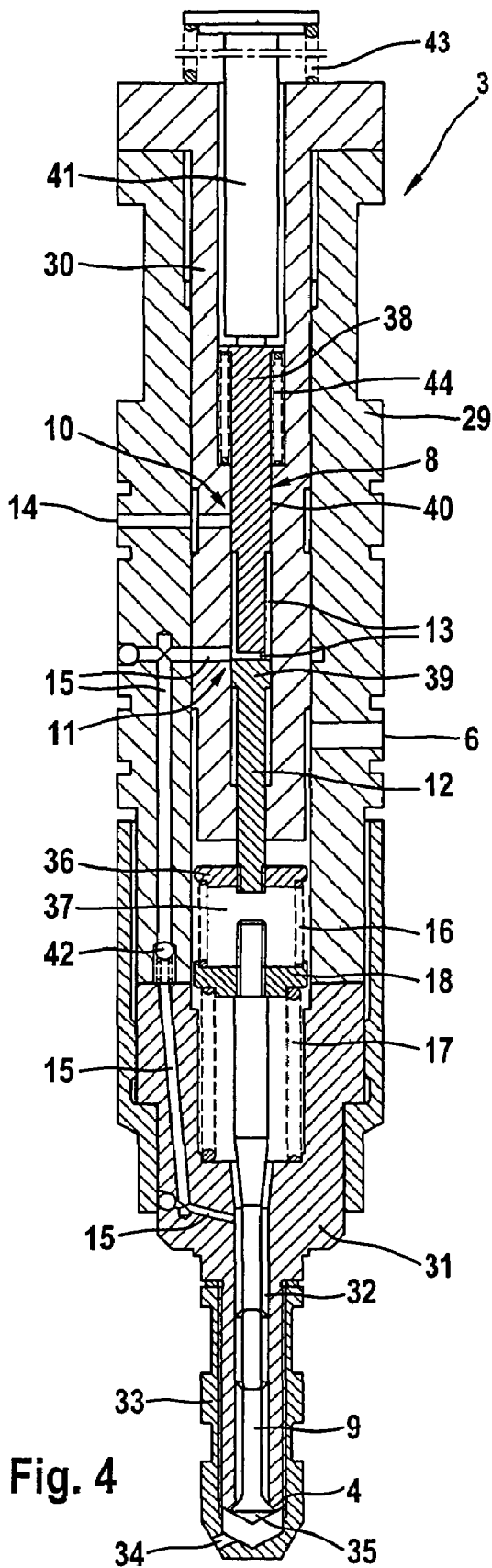
FIG. 4 shows the blow-in valve as per FIG. 1 at the start of delivery.
Figure 5:
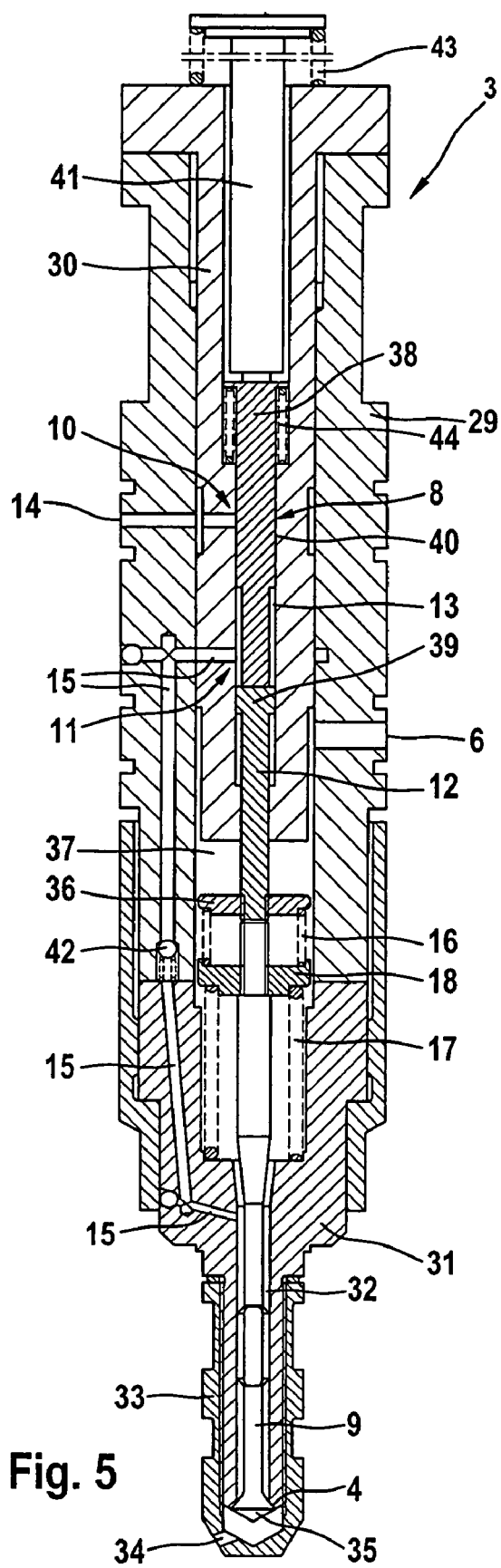
FIG. 5 shows the blow-in valve as per FIG. 1 at the end of delivery.
Figure 6:
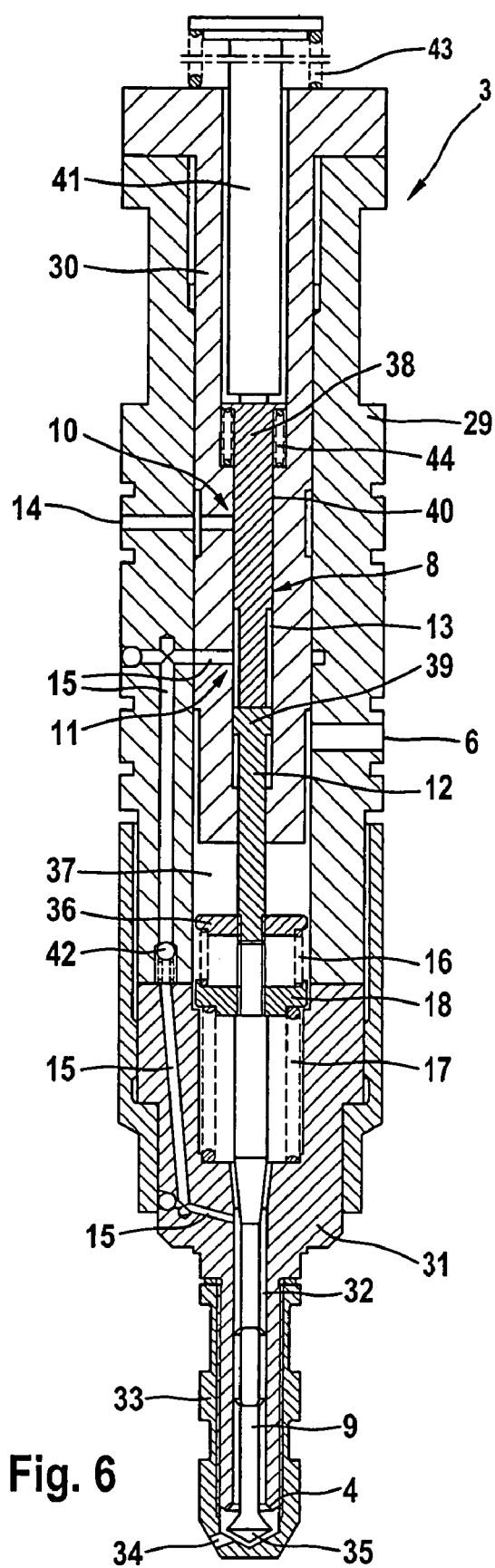
FIG. 6 shows the blow-in valve as per FIG. 1 during the blow-in process, with the valve needle open.

FIGS. 2 to 6 illustrate the blow-in valve 3 as successive phase images, with FIG. 2 showing the rest state, FIG. 6 showing the state where the blow-in nozzle 4 is open, and FIGS. 3 to 5 showing intermediate states or intermediate phases. Proceeding from the rest state as per FIG. 2, an opening of the blow-in valve 3 takes place via the intermediate phases as per FIGS. 3 to 5 up to open position as per FIG. 6, from which a closure of the blow-in valve 3 takes place in the reverse sequence.

During the pilot stroke, shown in FIG. 3, of the tappet 41 together with the valve piston 12, the slot controller 10 of the fuel inflow 14 is closed off by the axially moved piston section 38 of the plunger 8. The slot controller 11 of the fuel line 15 is also closed off in the shown rest position of the valve piston 12, thereby forming a hermetically closed-off volume of the fuel chamber 13. That volume of the fuel chamber 13 which is filled with substantially incompressible liquid fuel brings about, despite a remaining axial spacing between the plunger 8 and the valve piston 12, a connection which is substantially rigid in compression, or a transmission of force, in the axial movement direction from the plunger 8 to the valve piston 12.

During the pilot stroke shown in FIG. 3, a lower edge of the piston section 38 of the plunger 8 is situated at a spacing b to an upper edge of the piston section 39 of the valve piston 12. The spacing b is smaller than a spacing a between the two slot controllers 10, 11. It is thereby ensured that, during the pilot stroke shown in FIG. 3, the two slot controllers 10, 11 are simultaneously closed, thereby permitting the hydraulic transmission of force between the plunger 8 and the valve piston 12, and thereby storing a fixedly defined volume of fuel in the fuel chamber 13.

As a result of a further stroke by the tappet 41, the unit comprising of the plunger 8 and valve piston 12 which are hydraulically connected to one another is moved axially further downward until the position of the start of delivery shown in FIG. 4 is reached. During the and further axial movement of the plunger 8, the slot controller 10 remains closed, while the slot controller 11 is opened. The opened slot controller 11 brings about the interruption of the hydraulic connection between the plunger 8 and valve piston 12. A further axial stroke of the plunger 8 leads to fuel being delivered out of the fuel chamber 13, through the fuel line 15 with its non-return valve 42, into the annular space 32 and therefore to the blow-in nozzle 4. The fuel delivery takes place until the plunger 8 abuts the valve piston 12, which faces toward it, as shown in FIG. 5. The fuel quantity delivered through the fuel line 15 to the blow-in nozzle 4 corresponds exactly to the volume which is predefined by the axial spacing of the plunger 8 to the valve piston 12 in the fuel chamber 13 as per FIGS. 3 and 4.

The end of delivery of the fuel is reached when the plunger 8 abuts the valve piston 12. A further axial movement of the tappet 41 leads to the valve piston 12 being pressed down, by means of the plunger 8 which bears against it, into the intermediate position shown in FIG. 5. Here, the valve piston 12 is moved together with its pressure plate 36 counter to the preload force of the pressure spring 16 which acts from below, until the lower, free end of the valve piston 12 abuts the upper end of the valve needle 9 as per FIG. 5. The pressure spring 16 which acts on the pressure plate 36 of the valve piston 12 is compressed to a maximum extent. The geometry and preload force of said pressure spring 16 is coordinated with the pressure spring 17 which acts on the opposite side of the pressure plate 18 of the nozzle needle 9, in such a way that its pressure force which acts on the pressure plate 18, together with the internal pressure of air and fuel which acts on the valve head 35, is not sufficient to open the valve needle 9.

An opening of the nozzle needle 9, as illustrated in FIG. 6, takes place initially by means of the tappet 41 being pressed down further, wherein the tappet 41, the plunger 8, the valve piston 12 and the nozzle needle 9, connected in series, bear against one another in each case areally at the face side in the pressure direction. The axial pressure generated by the tappet 41 in the plunger 8 is transmitted indirectly via the valve piston 12 to the nozzle needle 9. A common axial movement of tappet 41, plunger 8, valve piston 12 and nozzle needle 9 takes place until the valve head 35 is raised from the sealing seat of the blow-in nozzle 4, corresponding to the illustration as per FIG. 6.

When the blow-in nozzle 4 is open, the gas pressure which prevails in the pressure source 7 (FIG. 1) and acts by way of the pressure connection 6 and the air chamber 37 on the annular space 32 brings about a blow-in of the combustion gas, together with the fuel quantity stored in the annular space 32, into the combustion chamber 5 (FIG. 1). In order to guide the blow-in process, one or more blow-in openings 34 are provided which are arranged in a nozzle head 33 which is screwed in the manner of a cap over the blow-in nozzle 4.

The end of the blow-in process is predefined by the drive of the tappet 41. Once a cam drive or the like releases the tappet 41, the pressure springs 16, 17, 43 and 44 move the arrangement comprising the nozzle needle 9, valve piston 12, plunger 8 and tappet 41 upward via the intermediate phases as per FIGS. 5 to 3 until the rest position shown in FIG. 2 is reached, in which a further fuel quantity is conducted through the fuel inflow 14 into the fuel chamber 13.

What is claimed is:

1. A fuel supply system for a spark-ignition internal combustion engine (1), having at least one cylinder (2) defining a combustion chamber (5), each including a blow-in valve (3) with a blow-in nozzle (4) for blowing a mixture of a liquid fuel and a pressurized combustion gas into the combustion chamber (5) by way of the blow-in nozzle (4), the blow-in valve (3) comprising a nozzle housing (29) having a pressure connection (6) for the introduction of the pressurized combustion gas into the nozzle housing (29) with the pressure of the combustion gas being provided by an external pressure source (7) and the blow-in valve (3) further including a piston/cylinder unit for delivering a metered quantity of liquid fuel, comprising a piston (12), a cooperating plunger (8) and a nozzle needle (9) arranged for actuation by the plunger (8), the plunger being actuated by an operating mechanism for the injection of the metered amount of fuel together with combustion gas into the combustion chamber (5), the piston (12) of the piston cylinder unit being arranged between the plunger (8) and the nozzle needle (9) coaxially with respect thereto, with a fuel chamber (13) for metering and delivering a fuel quantity which is to be blown into the combustion chamber (5) being formed between the plunger (8) and the valve piston (12), the plunger (8) forming a first slot controller (10) for controlling a fuel supply (14) into the fuel chamber (13), and the valve piston (12) forming a second slot controller (11) for a fuel line (15) extending from the fuel chamber (13) to the blow-in nozzle (4), and the first and second slot controllers (10, 11) being coordinated with one another in such a way that, at the end of metering and delivering the fuel quantity which is to be blown in, the plunger (8) abuts the valve piston (12).

2. The fuel supply system as claimed in claim 1, wherein the two slot controllers (10, 11) have a spacing (a) from one another exceeding a spacing (b) of two piston sections (38, 39) of the plunger (8) and of the piston (12) during a pilot stroke.

3. The fuel supply system as claimed in claim 1, wherein a non-return valve (42) is arranged in the fuel line (15).

4. The fuel supply system as claimed in claim 1, wherein an actuation of the nozzle needle (9) is provided by means of the valve piston (12) which is actuated by the plunger (8).

5. The fuel supply system as claimed in claim 4, wherein the valve piston (12), in the rest state, is an axially spaced from the nozzle needle (9).

6. The fuel supply system as claimed in claim 1, wherein the valve piston (12) is biased by pressure springs (16, 17), an actuation of the valve piston (12) and of the nozzle needle (9) being provided in each case counter to the preload force of a pressure springs (16, 17).

7. The fuel supply system as claimed in claim 6, wherein the two pressure springs (16, 17) are supported against a common pressure plate (18) which is fastened to the nozzle needle (9), with the preload force of the valve-piston-side pressure spring (16) in the compressed state being lower than a basic preload force of the nozzle-needle-side pressure spring (17).

8. The fuel supply system as claimed in claim 1, wherein an actuation of the plunger (8) is provided counter to the preload force of a pressure spring (44).

9. The fuel supply system as claimed in claim 1, wherein a tappet (41), which is in particular moveable counter to the preload force of a pressure spring (43), is provided for actuating the plunger (8).

10. The fuel supply system as claimed in claim 1, wherein the blow-in valve (3) is provided in the internal combustion engine (1) with at least one further fuel metering device (19) arranged in an intake duct (20) which opens out into the combustion chamber (5).

* * * * *